June 6, 1939.  S. SCHNELL  2,161,641
BRAKING MECHANISM
Filed Aug. 14, 1937  2 Sheets-Sheet 1
FIG. 1.
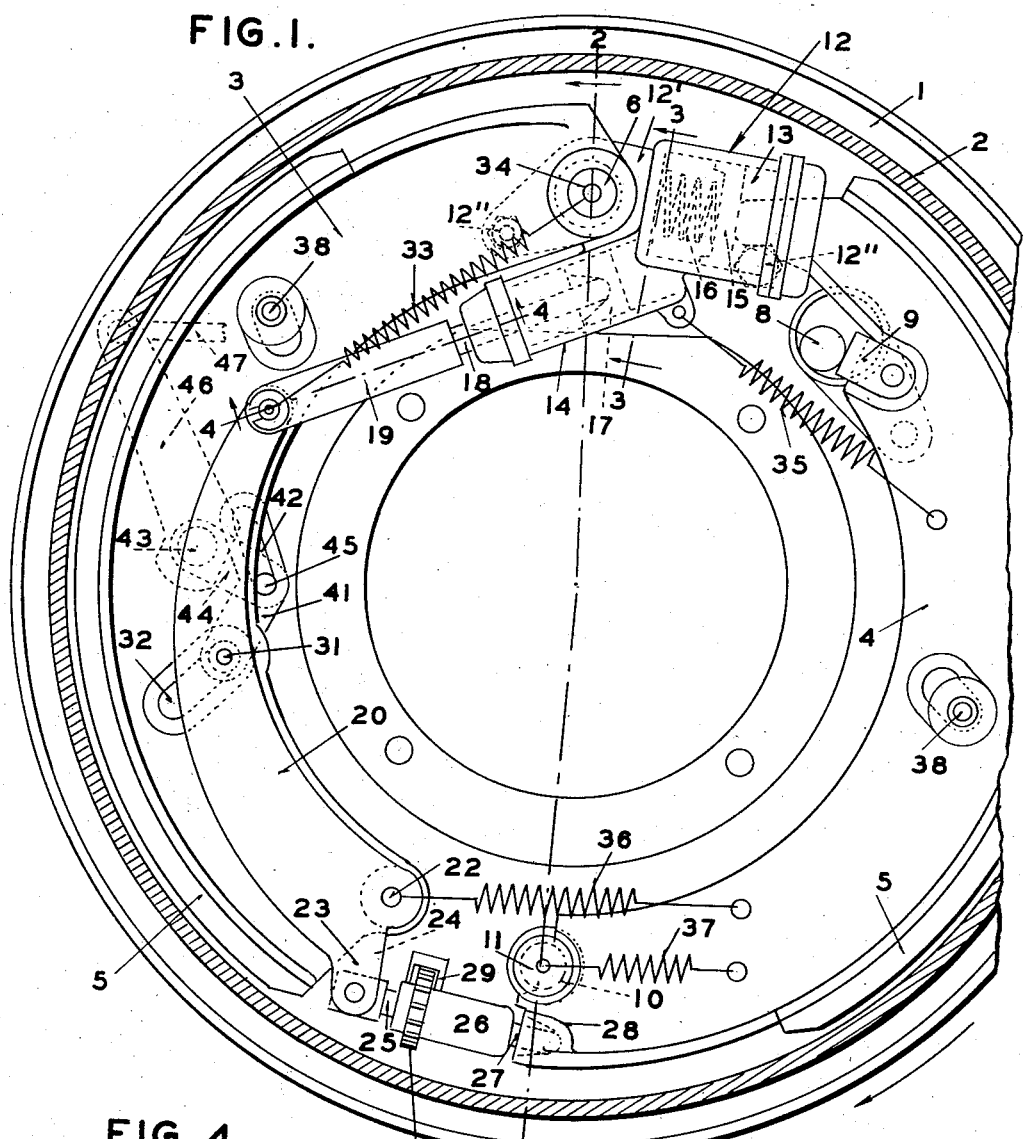
FIG. 4.
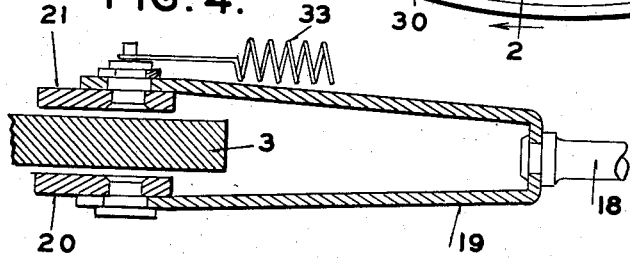
INVENTOR.
STEVE SCHNELL
BY
ATTORNEY.

June 6, 1939.　　　　S. SCHNELL　　　　2,161,641
BRAKING MECHANISM
Filed Aug. 14, 1937　　　2 Sheets-Sheet 2
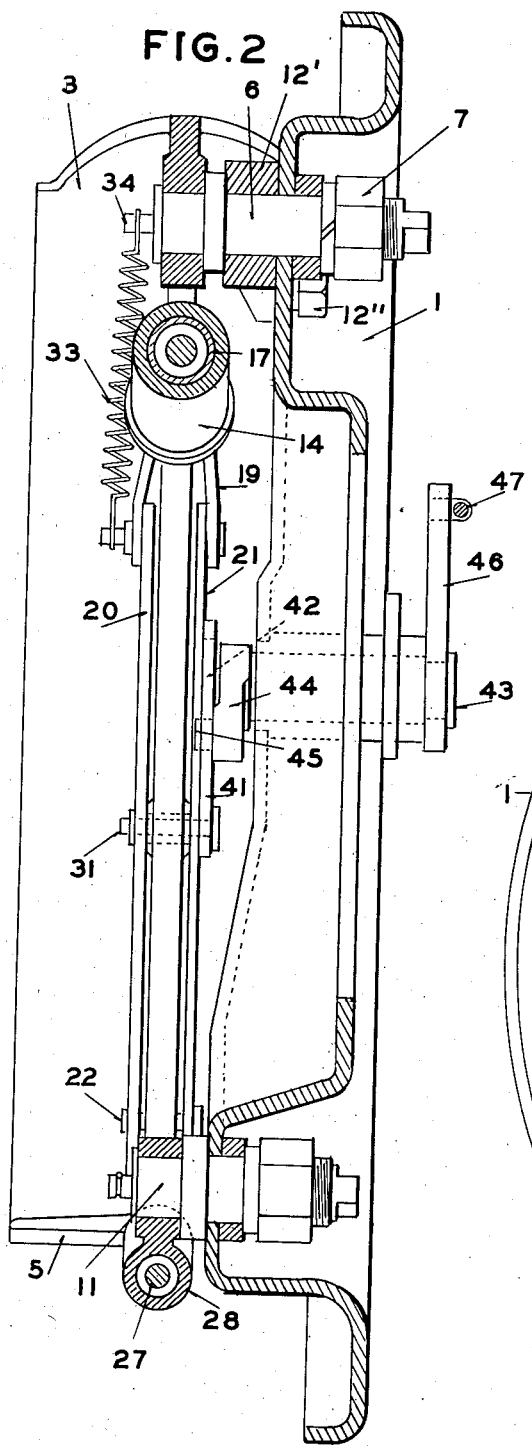
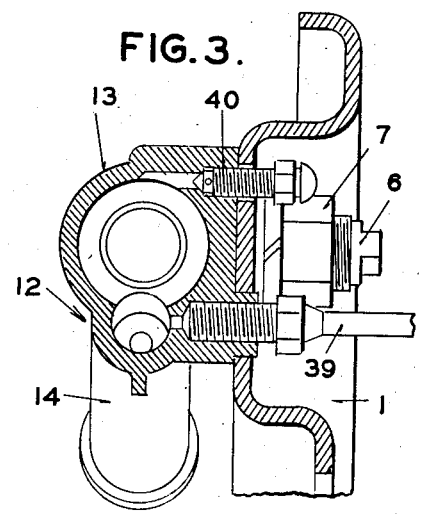
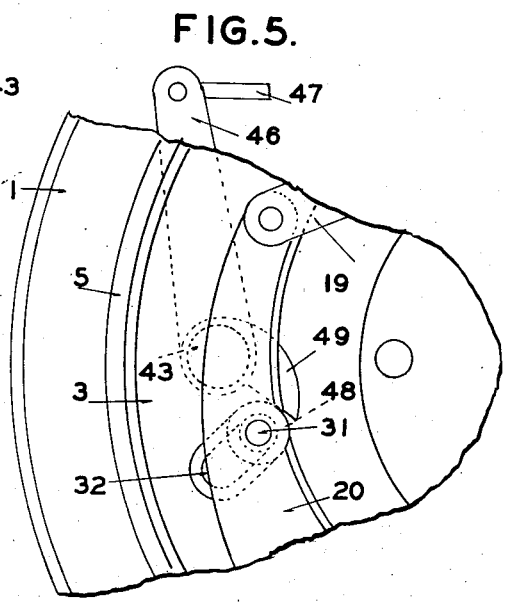
INVENTOR.
STEVE SCHNELL
BY 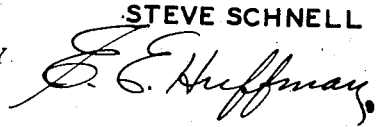
ATTORNEY.

Patented June 6, 1939

2,161,641

UNITED STATES PATENT OFFICE 2,161,641

BRAKING MECHANISM

Steve Schnell, St. Louis, Mo., assignor to Wagner Electric Corporation, St. Louis, Mo., a corporation of Delaware Application August 14, 1937, Serial No. 159,053

25 Claims. (Cl. 188—152)

My invention relates to brakes and more particularly to an improved braking assembly and means for actuating the shoes thereof.

One of the objects of my invention is to embody an improved actuating mechanism in a braking assembly having two shoes which are so anchored that they will act as "forward" shoes in one direction of rotation of the drum.

Another and more specific object is to provide a combined fluid and mechanical brake shoe actuating mechanism for a two-shoe brake which is so associated with the shoes that it will apply pressure to the leading end of one of the shoes in either direction of rotation of the drum and will simultaneously apply pressure to one end of the other shoe.

Other objects of my invention will become apparent from the following description taken in connection with the accompanying drawings in which Figure 1 is a side view of a brake assembly embodying my invention, the drum being shown in section; Figure 2 is a cross-sectional view through the brake taken on the line 2—2 of Figure 1; Figure 3 is a cross-sectional view of the fluid motor taken on the line 3—3 of Figure 1; Figure 4 is a cross-sectional view taken on the line 4—4 of Figure 1 showing the connection between one of the fluid motors and the lever; and Figure 5 is a side view of a modified construction for mechanically operating the actuating lever of the brake.

Referring to the drawings in detail, 1 indicates the usual backing plate which is fixed to a portion of the vehicle and encloses the open side of the drum 2 fixed to the wheel to be braked. Within the drum are two shoes 3 and 4 positioned in end-to-end relation and each shoe is provided with the usual lining 5 for cooperation with the drum. Shoe 3 at its upper end is pivotally mounted upon an anchor pin 6 carried by the backing plate and capable of adjustment by having the portion upon which the shoe is pivoted eccentric to the main body of the pin which extends through the backing plate and is held thereon by the nut 7. The shoe 4 has associated therewith at its upper end an adjustable anchor pin 8 carried by the backing plate and this pin cooperates with a shoulder 9 carried by the shoe. The anchor pin 8 is adjustably mounted on the backing plate in a manner similar to that of anchor pin 6. The lower end of shoe 4 is formed with a notched portion 10 which is adapted to receive and abut an anchor pin 11 also adjustably mounted on the backing plate.

A double fluid motor 12 is carried by the backing plate adjacent the anchor pin 6, this motor comprising a relatively large cylinder 13 and a smaller cylinder 14 integrally united and angularly positioned with respect to each other. The motor 12 has an integral plate 12' which surrounds pin 6 and the motor is secured to the backing plate by two bolts 12''. The construction is such that the anchor pin lends support to the fluid motor and the extension on the fluid motor by reason of its being bolted to the backing plate consists in bracing the anchor pin. The large cylinder 13 has mounted therein a piston 15 which cooperates with the upper end of shoe 4 and this piston is normally held in engagement with the shoe end by a light spring 16. The smaller cylinder 14 is also provided with a piston 17 which is adapted to actuate a piston rod 18 connected by means of a U-shaped clevis 19 with a pair of levers 20 and 21 (Figures 2 and 4). These levers are positioned on opposite sides of the web of shoe 3 and their lower ends are pivotally mounted on the lower end of shoe 3 by means of pin 22. The levers are provided with short arms 23 and 24 adjacent pivot 22 and they extend towards the drum in the manner shown in Figure 1. Pivotally connected to these arms is a bolt 25 which has threaded thereon a sleeve 26 provided at its end with a projection 27 engaging a socket 28 in the lower end of shoe 4. The bolt 25 and sleeve 26 form an adjustable link which may be lengthened or shortened by properly rotating the sleeve 26 upon the bolt. The sleeve is held in its adjusted position by means of a clip 29 which engages the teeth 30 on the sleeve.

The two levers 20 and 21 are held together by a suitable pin 31 which extends through a slot 32 in the web of shoe 3, and by means of this pin and slot the angular movement of the levers is limited. The levers are normally held in their "off" position, wherein pin 31 is against the inner end of slot 32, by means of a spring 33 connected to the upper ends of the levers and attached by a suitable pin 34 to the end of anchor pin 6. A spring 35 is connected to cylinder 14 and shoe 4 for normally holding shoulder 9 in engagement with anchor pin 8 when the shoe is in "off" position. A spring 36 is interposed between the lower ends of the two shoes and also the lower end of shoe 4 is held in engagement with anchor pin 11 by means of a relatively light spring 37. Shoes 3 and 4 are provided with steady rests 38 to prevent lateral shifting of the shoes. The cylinders of fluid motor 12 are in constant communication with each other and fluid under pressure is applied thereto by means of a conduit 39 (Figure 3) which leads to a suitable source of pressure, as for example, a master cylinder device. The cylinder 13 is also provided with a bleed valve 40 for removing air from the cylinder during filling of the system.

Referring to the operation of the above described brake, the normal position of the parts when the shoes are in retracted position is as shown in Figure 1. If now the drum is rotating in the direction indicated by the arrow which is the rotation of the drum corresponding to the forward movement of the vehicle, and fluid pressure is forced into cylinders 13 and 14 ahead of their respective pistons, shoe 4 will be forced out into engagement with the drum by means of the movement of piston 15. Due to the direction of rotation of the drum the shoe will remain anchored against anchor pin 11 and since pressure is being applied to the leading end of the shoe, it will act as a "forward" shoe and thus its maximum braking torque will be available for braking. Simultaneously with the movement of piston 15, piston 17 of cylinder 14 will also be operated. This will result in levers 20 and 21 being swung in a counter-clockwise direction about pivot pin 22 and by means of arms 23 and 24 and the adjustable link elements 25 and 26 the lower end of shoe 3 will be rotated about its pivot 6 and forced into engagement with the drum. Under these conditions the pressure on shoe 3 is also being applied at the leading end of the shoe and this shoe will, therefore, act as a "forward" shoe and will produce its maximum braking effect in the same manner as shoe 4. The operation of the levers will not force shoe 4 away from its pivot 11 when it applies force to the lower end of shoe 3 since shoe 4 is being held in engagement with anchor pin 11 by means of piston 15 and also the force resulting from the drag of the shoe with the brake drum. These two forces will be greater than the opposing force applied through the adjustable link elements 25 and 26 tending to move the shoe away from pivot 11. The ratio of levers 21 and 22 and the relationship of the parts are such that the pressure being applied to the lower end of shoe 3 is substantially the same as that being applied to the upper end of shoe 4 by means of piston 15. The shoes will, therefore, produce substantially the same braking torque.

When the drum is rotating in the direction opposite to that indicated by the arrow and pistons 15 and 17 are operated by fluid pressure, shoe 4, when brought into engagement with the drum by piston 15, will be dragged with the drum and will cause shoulder 9 to engage anchor pin 8. This action is also assisted by means of the operation of levers 20 and 21 as such levers are now tending to expand the lower ends of shoes 3 and 4 through arms 23 and 24 and the adjustable link. The levers thus expand the two ends of the shoes and pressure is applied to each of the shoes through the lever and link construction. Piston 15 and cylinder 13 will be unable to force shoe 4 away from anchor pin 8 due to the fact that the force being applied to the lower end of shoe 4 by means of the levers and the force caused by the drag of the shoe with the drum will be greater than that being produced by piston 15. It is thus seen that in the reverse direction of rotation of the drum, shoe 4 will act as a "forward" shoe since it anchors at its trailing end and pressure is being applied to its leading end. The shoe 3 under these circumstances will act only as a "reverse" shoe since it is being anchored at its leading end and pressure is being applied to its trailing end through the lever and link construction. The brake under these conditions does not produce as great a braking torque as would be the case when the drum is rotating in the direction indicated by the arrow but the braking torque produced is sufficient for all practical purposes since the brakes on a vehicle are not employed to stop the vehicle at excessive high speeds when it is moving backward.

I have also provided mechanical actuating means for the brake in order that the brake may be used for parking service when it is desired to maintain the brakes in engagement with the drum for an indefinite period of time. Referring to Figures 1 and 2, pin 31 which extends through slot 32 in shoe 3 and connects levers 20 and 21 together has pivotally mounted thereon an angular-shaped link 41 the upper arm of which is provided with a slot 42. A shaft 43 extends through the backing plate adjacent the shoe and secured to the inner end of this shaft is an arm 44 which has its free end provided with a pin 45 extending into slot 42. The outer end of the shaft is provided with an arm 46 which is connected to a rod 47 leading to a conveniently positioned lever in the driver's compartment of the vehicle.

When the pull rod 47 is moved to the right, shaft 43 will be rotated in a clockwise direction and pin 45 carried by the end of arm 44 will move link 41 and since this link is connected to the two levers 20 ad 21 by means of pin 31, the levers will be swung in a counter-clockwise direction, thus spreading the lower ends of shoes 3 and 4 apart and engaging the shoes with the drum. Under these conditions shoe 4 will anchor on pin 8 and will be maintained in this position by the pressure imparted to the shoe by the levers and link. The slot 42 in link 41 permits the levers to be actuated by means of piston 17 in cylinder 14 without affecting lever 46. When the connecting link is adjusted between arms 23 and 24 and the lower end of shoe 4 by rotating sleeve 26, the mechanical actuating structure will not be disturbed and, therefore, it will not be necessary to also adjust this structure to take up any slack. As the sleeve is rotated, shoe 3, levers 20, and pin 31 will all swing about pivot 6. Link 41 will thus be swung around pin 45 and pin 45 will remain adjacent the end of slot 42 as shown in Figure 1 and no substantial slack will be created between arm 44 and link 41 which must be taken up by adjusting pull rod 47. This is an important feature as it considerably simplifies the adjustment of the brake.

Referring to Figure 5, I have shown a slightly modified form of mechanism for mechanically operating levers 20 and 21. In this construction pin 31 which connects the two levers together is provided at its inner end with a roller 48 and shaft 43 which extends through the backing plate carries on its inner end a cam arm 49 which is adapted to directly engage roller 48. In this construction it is readily seen that when lever 46 is rotated in a clockwise direction arm 49 will rotate levers 20 and 21 in a counter-clockwise direction by means of arm 49 and roller 48. This construction permits the levers to be operated by piston 17 without affecting any movement of arm 46 and the connecting rod 47 leading to the operating lever in the same manner as in the construction described with respect to Figures 1 and 2. Also adjustment of sleeve 26 does not move roller 48 away from cam arm 49 and necessitate adjustment of the mechanical actuating mechanism.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking mechanism, the combination of a support, a rotatable brake drum, two shoes positioned in end-to-end relation in the drum, anchors for the shoes, means for applying pressure to the leading ends of said shoes when the drum is rotating in one direction and for applying pressure to one pair of adjacent ends of the shoes when the drum is rotating in the opposite direction, said means comprising two inter-communicating fluid motors both of which are positioned remote from said pair of adjacent ends to which pressure is applied, one of said fluid motors being adapted to apply pressure to the adjacent end of one of the shoes, and means for applying pressure by the other motor to the said pair of adjacent ends.

2. In braking mechanism, the combination of a support, a rotatable drum, two brake shoes positioned in end-to-end relation within the drum, means constituting an anchor for one end of one of the shoes when the drum is rotating in one direction, means constituting an anchor for the other end of said shoe when the drum is rotating in the other direction, anchor means for one end of the other shoe, a fluid motor positioned adjacent the anchored end of the second shoe and adapted to actuate the adjacent end of the first named shoe, a second fluid motor positioned adjacent the first named fluid motor and in communication therewith, and means operated by the second fluid motor for applying pressure to the adjacent ends of the two shoes positioned remote from the fluid motors.

3. In braking mechanism, the combination of a support, a rotatable drum, two brake shoes positioned in end-to-end relation within the drum, means constituting an anchor for one end of one of the shoes when the drum is rotating in one direction, means constituting an anchor for the other end of said shoe when the drum is rotating in the other direction, means for pivotally anchoring one end of the other shoe, a fluid motor positioned adjacent the pivotal anchor of the second shoe and adapted to actuate the adjacent end of the first named shoe, a second fluid motor positioned adjacent the first named fluid motor and in communication therewith, means for applying pressure to the adjacent ends of the two shoes positioned remote from the fluid motors and comprising a lever pivoted on the second shoe, and means for actuating the lever by the second fluid motor.

4. In braking mechanism, the combination of a support, a rotatable drum, two brake shoes positioned in end-to-end relation within the drum, means constituting an anchor for one end of one of the shoes when the drum is rotating in one direction, means constituting an anchor for the other end of said shoe when the drum is rotating in the opposite direction, means for pivotally anchoring one end of the other shoe, a fluid motor positioned adjacent the pivotal anchor of the second shoe and adapted to actuate the adjacent end of the first named shoe, a second fluid motor positioned adjacent the first named fluid motor and in communication therewith, a lever pivotally mounted on the end of the second shoe remote from its pivot and having an arm coextensive with the shoe, a connection between said lever and the adjacent end of the first named shoe for applying pressure to the adjacent ends of both shoes, and means for connecting the arm of the lever to the second fluid motor.

5. In braking mechanism, the combination of a support, a rotatable drum, two brake shoes positioned in end-to-end relation within the drum, means constituting an anchor for one end of one of the shoes when the drum is rotating in one direction, means constituting an anchor for the other end of said shoe when the drum is rotating in the opposite direction, anchor means for one end of the other shoe, a double piston fluid motor positioned adjacent the anchored end of the second shoe and adapted to actuate the adjacent end of the first named shoe by means of one of its pistons, and means operable by the other piston of said fluid motor for applying pressure to the ends of the shoes positioned remote from the fluid motor.

6. In braking mechanism, the combination of a support, a rotatable drum, two brake shoes positioned in end-to-end relation within the drum, means constituting an anchor for one end of one of the shoes when the drum is rotating in one direction, means constituting an anchor for the other end of said shoe when the drum is rotating in the opposite direction, anchor means for one end of the other shoe, a double piston fluid motor positioned adjacent the anchored end of the second shoe and adapted to actuate the adjacent end of the first named shoe by means of one of its pistons, and means operable by the other piston of said fluid motor for applying pressure to the ends of the shoes positioned remote from the fluid motor, said means comprising a lever and link mechanism.

7. In braking mechanism, the combination of a support, a rotatable drum, two brake shoes positioned in end-to-end relation within the drum, means constituting an anchor for one end of one of the shoes when the drum is rotating in one direction, means constituting an anchor for the other end of said shoe when the drum is rotating in the opposite direction, anchor means for one end of the other shoe, a double piston fluid motor positioned adjacent the anchored end of the second shoe and adapted to actuate the adjacent end of the first named shoe by means of one of its pistons, and means operable by the other piston of said fluid motor for applying pressure to the ends of the shoes positioned remote from the fluid motor, said means comprising a lever pivoted on the remote end of the second shoe and actuated by said other piston and a link connecting said lever with the remote end of the first named shoe.

8. In braking mechanism, the combination of a support, a rotatable drum, two shoes positioned in end-to-end relation in the drum, anchors for the shoes, two integral inter-communicating fluid motors positioned adjacent one end of one of the shoes, one of said fluid motors having its axis positioned substantially at right angles to a radius of the brake and adapted to apply pressure to said adjacent shoe end and the other of said fluid motors having its axis positioned at an angle to the first named motor, and means operable by the second named motor for applying pressure to the adjacent shoe ends substantially diametrically opposite the fluid motors.

9. In braking mechanism, the combination of a support, a rotatable drum, two shoes positioned in end-to-end relation in the drum, anchors for the shoes, two integral inter-communicating fluid motors positioned adjacent one end of one of the shoes, one of said fluid motors having its axis positioned substantially at right angles to a radius of the brake and adapted to apply pressure to said adjacent shoe end and the other of said fluid motors having its axis positioned at an angle to the first named motor, and means operable by the second named motor for applying pressure to the adjacent shoe ends substantially diametrically opposite the fluid motors, said means comprising a lever and link mechanism.

10. In braking mechanism, the combination of a support, a rotatable drum, two shoes positioned in end-to-end relation in the drum, anchors for the shoes, two integral inter-communicating fluid motors positioned adjacent one end of one of the shoes, one of said fluid motors having its axis positioned substantially at right angles to a radius of the brake and adapted to apply pressure to said adjacent shoe end and the other of said fluid motors having its axis positioned at an angle to the first named motor, and means operable by the second named motor for applying pressure to the adjacent shoe ends substantially diametrically opposite the fluid motors, said means comprising a lever pivoted to one of the shoes and actuated by the said second fluid motor and a link connecting the lever to the other shoe.

11. In braking mechanism, the combination of a support, a rotatable drum, two brake shoes positioned in end-to-end relation in the drum, means constituting an anchor for one end of one of the shoes when the drum is rotating in one direction, means constituting an anchor for the other end of said shoe when the drum is rotating in the opposite direction, means for pivotally anchoring one end of the other shoe, a fluid motor carried by the support adjacent the pivotal anchor of the second named shoe and adapted to actuate the adjacent end of the first named shoe, a lever pivoted to the unanchored end of the second shoe, said lever having an arm extending along side of said second shoe toward the anchor thereof, an adjustable link connected to said lever and abutting the adjacent end of the first named shoe, a second fluid motor integral with the first named motor and having its axis positioned at an angle to the axis of the first motor, means for actuating the arm of the lever by the second motor, cooperating means between the arm and the shoe for limiting the extent of movement of the lever, and means for simultaneously applying fluid under pressure to both motors.

12. In braking mechanism, the combination of a support, a rotatable drum, a brake shoe positioned within the drum, means constituting an anchor for one end of the shoe, means for actuating the other end of the shoe and comprising a lever pivoted to said other end and extending toward the anchored end of the shoe, cooperating means on the lever and shoe for limiting the angular movement of the lever, a link connected to the free end of the lever, and a fluid motor positioned adjacent the anchored end of the shoe and connected to the link for operating the lever.

13. In braking mechanism, the combination of a support, a rotatable drum, two brake shoes positioned in end-to-end relation in the drum, anchors for one pair of adjacent ends of the shoes, means for expanding the other pair of adjacent ends and comprising a lever pivoted to the end of one of the shoes and having an arm extending in juxtaposition to said shoe, means forming a slot in the shoe web, a pin carried by the arm of the lever and extending through the slot, a rotatable shaft carried by the support, a connection between said shaft and the pin whereby rotation of the shaft will actuate the lever, and means for rotating the shaft.

14. In braking mechanism, the combination of a support, a rotatable drum, two brake shoes positioned in end-to-end relation in the drum, anchors for one pair of adjacent ends of the shoes, means for expanding the other pair of adjacent ends and comprising a lever pivoted to the end of one of the shoes and having an arm extending in juxtaposition to said shoe, means forming a slot in the shoe web, a pin carried by the arm of the lever and extending through the slot, a link pivoted on said pin, a rotatable shaft carried by the support and having an arm connected to the link, and means for rotating the shaft.

15. In braking mechanism, the combination of a support, a rotatable drum, two brake shoes positioned in end-to-end relation in the drum, anchors for one pair of adjacent ends of the shoes, means for expanding the other pair of adjacent ends and comprising a lever pivoted to the end of one of the shoes and having an arm extending in juxtaposition to said shoe, means forming a slot in the shoe web, a pin carried by the arm of the lever and extending through the slot, a roller on the pin, a rotatable shaft carried by the support, an arm on the shaft adapted to engage the roller, and means for rotating the shaft.

16. In braking mechanism, the combination of a support, a rotatable drum, two brake shoes positioned in end-to-end relation in the drum, anchors for one pair of adjacent ends of the shoes, a lever pivoted to the other end of one shoe, a longitudinally adjustable link connecting said lever with the adjacent end of the other shoe, cooperating means on the lever and shoe for limiting the movement of the lever, an actuating lever carried by the support, and a connection between said actuating lever and the lever on the shoe, said connection being so arranged that when the link is adjusted to move said shoe and the lever toward and away from the drum and about the shoe anchor to compensate for wear the relationship of the parts will remain substantially the same.

17. In braking mechanism, the combination of a support, a rotatable drum, two brake shoes positioned in end-to-end relation in the drum, anchors for one pair of adjacent ends of the shoes, a lever pivoted to the other end of one shoe and extending along side the shoe, a longitudinally adjustable link connecting said lever with the adjacent end of the other shoe, cooperating means on the lever and shoe for limiting the movement of the lever, a shaft carried by the support, an arm on said shaft, means for operating said lever by said arm, and means for rotating the shaft, said arm being so positioned and operatively associated with the lever that when the link is adjusted to move the shoe and the lever toward the drum and about the shoe pivot there will be no appreciable slack created between the arm and the lever.

18. In braking mechanism, the combination of a support, a rotatable brake drum, two shoes positioned in end-to-end relation in the drums, anchors for the shoes, means for applying equal pressures to the leading ends of said shoes when the drum is rotating in one direction, said means comprising a double piston fluid motor one piston of which applies pressure directly to the end of one shoe, and means including a lever and linkage mechanism for applying pressure to the remote end of the other shoe by the other piston, the area of said last named piston and the leverage ratio of said lever being such that the pressure applied to the remote end of the other shoe will be substantially the same as that applied directly to the end of the first named shoe by the first named piston.

19. In braking mechanism, the combination of a support, a rotatable drum, two shoes positioned in end-to-end relation in the drum, anchors for the shoes, a fluid motor having a piston for applying pressure directly to the leading end of one shoe by a short stroke when the drum is rotating in one direction, a second fluid motor having a piston of smaller diameter than the first named piston for applying pressure to the leading end of the other shoe by a longer stroke, a lever and link mechanism for connecting the second piston to said leading end of the other shoe, and means for simultaneously applying fluid under pressure to both motors.

20. In braking mechanism, the combination of a support, a rotatable drum, two brake shoes positioned in end-to-end relation within the drum, means constituting an anchor for one end of one of the shoes when the drum is rotating in one direction, means constituting an anchor for the other end of said shoe when the drum is rotating in the other direction, anchor means for one end of the other shoe, a fluid motor positioned adjacent the anchored end of the second shoe and adapted to actuate the adjacent end of the first named shoe, a second fluid motor positioned adjacent the first named fluid motor and in communication therewith, and means operated by the second fluid motor for applying pressure to the adjacent ends of the two shoes positioned remote from the fluid motors, the movable elements of both of said fluid motors being movable to actuate the shoes when the drum is rotating in one direction and only the movable element of said second fluid motor being movable to actuate the shoes when the drum is rotating in the other direction.

21. In braking mechanism, the combination of a backing plate, a rotatable drum, brake shoes positioned in end-to-end relation in the drum, a fluid motor secured to the backing plate and adapted to actuate one end of one of the shoes, said fluid motor being provided with an extension having a side surface engaging the surface of the backing plate, an anchor pin for the adjacent end of the other shoe, said anchor pin extending through coinciding openings in the backing plate and the fluid motor extension, and means for securing said pin to the plate and clamping the extension against the plate.

22. In braking mechanism, the combination of a backing plate, a rotatable drum, a brake shoe positioned in the drum, said shoe being provided with a notch at one end and a socket between said notch and the lining carrying portion of the shoe, an anchor pin carried by the backing plate and adapted to be engaged by the notched portion of the shoe end when the drum is rotating in one direction, means constituting an anchor for the other end of the shoe when the drum is rotating in the other direction, an actuating lever, and a link connected to said lever and provided with an end projecting into the socket in the end of the shoe.

23. In braking mechanism, the combination of a support, a rotatable brake drum, two shoes positioned in end-to-end relation in the drum, anchors for the shoes, fluid pressure actuated means positioned adjacent one pair of ends of the shoes and capable of directly actuating one shoe end of said pair of ends by an axial movement of an element of said fluid pressure actuated means in a direction corresponding to the direction in which the shoe end is moved, and means for also actuating the other and remote pair of ends of the shoes by the fluid pressure actuated means and including a single force transmitting mechanism connected to the fluid pressure actuated means and both of said shoe ends.

24. In braking mechanism, the combination of a support, a rotatable brake drum, two shoes positioned in end-to-end relation in the drum, anchors for the shoes, means for applying pressure to the leading ends of said shoes when the drum is rotating in one direction and for applying pressure to one pair of adjacent ends of the shoes when the drum is rotating in the opposite direction, said means comprising fluid pressure actuated means positioned remote from said pair of adjacent ends to which pressure is applied and adapted to directly apply pressure to the adjacent end of one of the shoes, and means for applying pressure by said fluid pressure actuated means to the said pair of adjacent ends and including a single force transmitting mechanism connected to the fluid pressure actuated means and both of said shoe ends.

25. In braking mechanism, the combination of a support, a rotatable brake drum, two shoes positioned in end-to-end relation in the drum with the pairs of adjacent ends at diametrically opposite sides of the drum, anchors for the shoes, a double piston fluid motor positioned adjacent one pair of ends of the shoes and having one of its pistons so associated with one shoe end of said pair of ends that it is capable of directly actuating said shoe end by an axial movement in a direction corresponding to the direction in which the shoe is moved, and means for actuating the pair of ends of the shoes diametrically opposite the fluid motor by the other piston of said fluid motor.

STEVE SCHNELL.